United States Patent
Lin

(10) Patent No.: US 12,496,982 B2
(45) Date of Patent: Dec. 16, 2025

(54) DISPLAY SCREEN HOMING METHOD APPLICABLE IN A VEHICLE, VEHICLE AND ELECTRONIC DEVICE EMPLOYING METHOD

(71) Applicants: Futaijing Precision Electronics (Yantai) Co., Ltd., Yantai (CN); HON HAI PRECISION INDUSTRY CO., LTD., New Taipei (TW)

(72) Inventor: Kuan-Hao Lin, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 104 days.

(21) Appl. No.: 18/395,888

(22) Filed: Dec. 26, 2023

(65) Prior Publication Data

US 2025/0162513 A1 May 22, 2025

(30) Foreign Application Priority Data

Nov. 22, 2023 (CN) .......................... 202311568246.4

(51) Int. Cl.
| | |
|---|---|
| *B60R 11/02* | (2006.01) |
| *B60K 35/22* | (2024.01) |
| *B60K 35/28* | (2024.01) |
| *B60R 11/00* | (2006.01) |

(Continued)

(52) U.S. Cl.
CPC .......... *B60R 11/0229* (2013.01); *B60K 35/22* (2024.01); *B60K 35/28* (2024.01); *B60W 40/105* (2013.01); *B60W 50/14* (2013.01); *B60K 2360/126* (2024.01);

(Continued)

(58) Field of Classification Search
CPC ........ B60R 11/0229; B60R 2011/0085; B60K 35/28; B60K 35/22; B60K 2360/126; B60W 40/105; B60W 50/14; B60W 2050/143; B60W 2050/146; G08G 1/00;

(Continued)

(56) References Cited

U.S. PATENT DOCUMENTS

| | | | |
|---|---|---|---|
| 9,233,645 B2 * | 1/2016 | Schofield | B60K 35/10 |
| 2006/0047426 A1 * | 3/2006 | Vitito | B60K 35/22 |
| | | | 701/469 |

(Continued)

FOREIGN PATENT DOCUMENTS

| | | | | |
|---|---|---|---|---|
| EP | 2586642 A1 * | 5/2013 | ............ | B60K 35/22 |
| GB | 2424402 B * | 9/2007 | ............ | B60R 16/02 |

*Primary Examiner* — Tuan C To
(74) *Attorney, Agent, or Firm* — ScienBiziP, P.C.

(57) ABSTRACT

A display screen homing method applicable in a vehicle comprises: obtaining a current angle of a display screen in the vehicle, receiving a first objective angle when the display screen is in a first objective position, determining whether the first objective angle is equal to the current angle and whether the first objective angle is greater than a maximum rotation angel, switching the driving member from the locked state to an unlocked state when the first objective angle is determined not equal to the current angle and the first objective angle is determined not greater than the maximum rotation angel, and rotating the display screen to the first objective angle by the driving member. An electronic device and the vehicle are also disclosed.

15 Claims, 3 Drawing Sheets

(51) Int. Cl.
*B60W 40/105* (2012.01)
*B60W 50/14* (2020.01)

(52) U.S. Cl.
CPC  *B60R 2011/0085* (2013.01); *B60W 2050/143* (2013.01); *B60W 2050/146* (2013.01)

(58) Field of Classification Search
CPC .......... G08G 1/052; B60Q 9/00; B60Q 9/002; B60Q 9/008
USPC .......................................................... 701/36
See application file for complete search history.

(56) References Cited

U.S. PATENT DOCUMENTS

| | | | |
|---|---|---|---|
| 2016/0059795 A1* | 3/2016 | Rook | B60R 11/02 108/44 |
| 2021/0301919 A1* | 9/2021 | Kimura | F16H 61/22 |
| 2022/0161813 A1* | 5/2022 | Oba | G08G 1/09675 |
| 2023/0136010 A1* | 5/2023 | Tsushima | G01D 5/12 340/5.7 |
| 2024/0294115 A1* | 9/2024 | Komatsu | B60R 1/25 |

* cited by examiner

DISPLAY SCREEN HOMING METHOD APPLICABLE IN A VEHICLE, VEHICLE AND ELECTRONIC DEVICE EMPLOYING METHOD

FIELD

The subject matter herein generally relates to vehicle display screen field.

BACKGROUND

As new energy related fields being developed, new energy technology continuously broke through limitations of traditional fuel-based vehicles, and many new energy vehicles have emerged in the market. New energy vehicles may be charged faster, and cost is becoming lower, so many users opted to buy new energy vehicles.

An interior design of new energy vehicles may be simplified to increase users' driving experience. Multiple large-size display screens may be provided in new energy vehicles. Users may be able to operate different display screens to control various states of new energy vehicles. To operate each display screen of a vehicle is the same as operating a smartphone, therefore, it is easy for most users to learn to operate the display screens.

Rotations of the display screen may affect driving safety of the vehicle. For example, when the user operates a first display screen, but mistakenly touches a second display screen, and the second display screen may rotate unexpectedly. Then the user may turn his/her attention to the second display screen and try to rotate the second display screen to an initial position. In the meanwhile, an accident may be happened.

BRIEF DESCRIPTION OF THE DRAWINGS

Implementations of the present disclosure will now be described, by way of embodiments, with reference to the attached figures.

DETAILED DESCRIPTION

Figure 1:
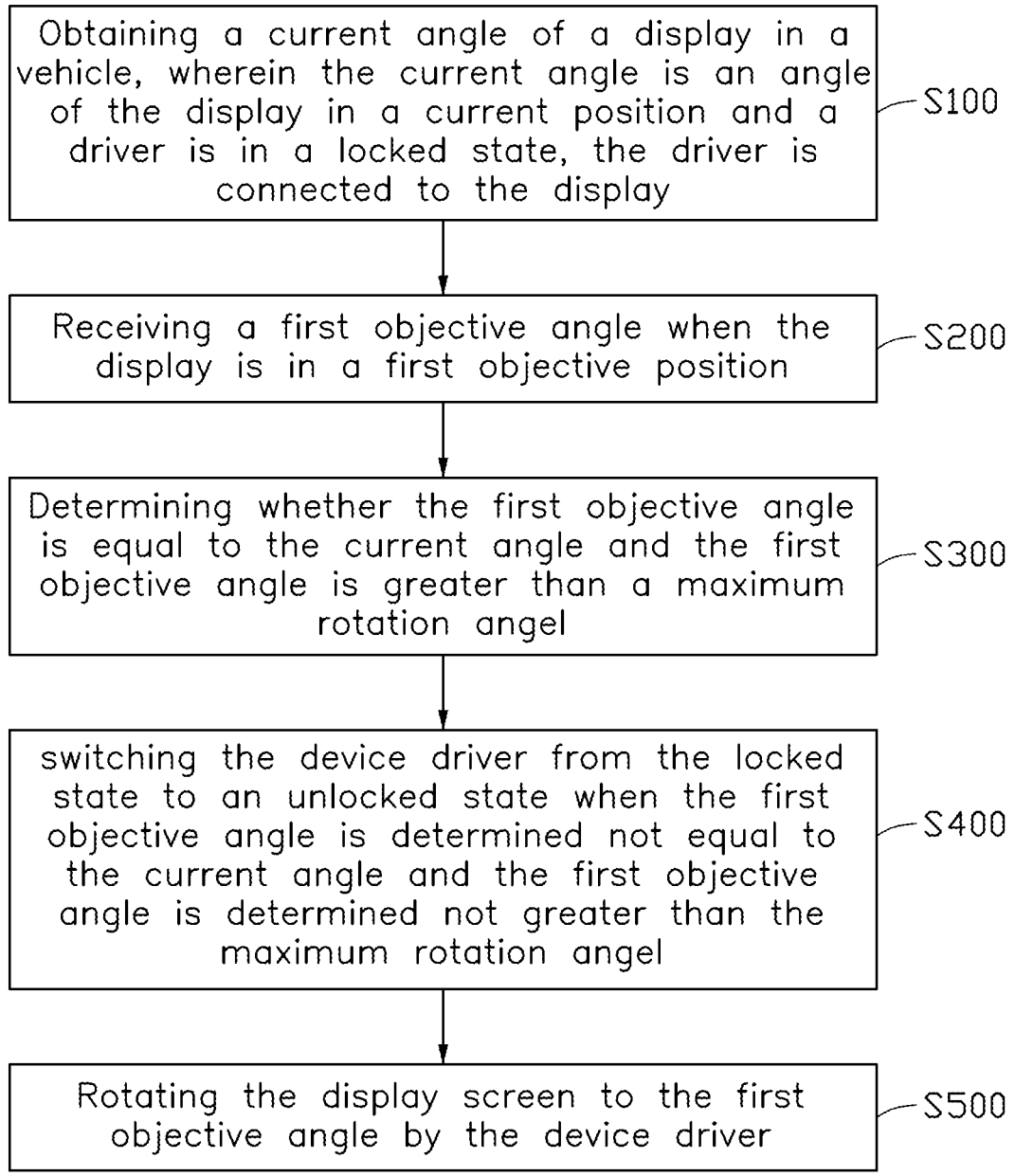
FIG. 1 is a flowchart of an embodiment of a display screen homing method applicable in a vehicle according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates one exemplary embodiment of a display screen homing method applicable in a vehicle. The flowchart presents an exemplary embodiment of the method. The exemplary method is provided by way of example, as there are a variety of ways to carry out the method. Each block shown in FIG. 1 may represent one or more processes, methods, or subroutines, carried out in the example method. Furthermore, the illustrated order of blocks is illustrative only and the order of the blocks can change. Additional blocks can be added, or fewer blocks may be utilized, without departing from this disclosure.

The display screen homing method applicable in a vehicle is used for a vehicle display screen homing system. The vehicle display screen homing system is provide to the vehicle. The vehicle can be household vehicles, commercial vehicles, engineering vehicles. The example method can be begun at block S100.

In block S100, a current angle of a display screen is obtained, the current angle is an angle of the display screen in a position and a driving member is in a locked state, the driving member is connected to the display screen.

In one embodiment, the current angle of the display screen is defined between the position of the display screen and a horizontal line on the ground, the driving member connected to the display screen is in the locked state, and the display screen can be not rotated mistakenly. The vehicle has multiple display screens. Users can rotate multiple display screens to transform some instructions to the vehicle. Each of display screens is provided with a corresponding driving member. The rotation and homing of the display screen are driven by the driving member. For example, the driving member can be a motor.

In one embodiment, when the driving member is the motor. The motor is provided with a hall sensor. The hall sensor can detect a rotation state and rotation angle of the display screen. The current angle can be obtained by the rotation angle of the display screen. In other embodiments, the motor can be provided with other sensors.

In other embodiments, users can rotate multiple display screens in the vehicles. The user can manually rotate one or more display screens in the vehicle, or the user can rotate the display screen by voice control technology. For example, the user can use voice input or manual input in the vehicle display screen homing system to rotate the display screen.

In block S200, a first objective angle is received when the display screen is in a first objective position.

In one embodiment, when the display screen is in the first objective position, the first objective angle of the first objective position can be received, the vehicle display screen homing system can receive the first objective angle. For example, when the current angle of the display screen is 30°, the first objective angle is 90°. The first objective angle refers to an angle between the display screen at the first objective position and the horizontal line on the ground. In other embodiments, the user can also rotate the display screen manually, and the sensor in the driving member connected to the display screen can detect the first objective angle.

In block S300, the first objective angle is determined equal to the current angle and is determined greater than a maximum rotation angel.

In one embodiment, multiple display screens are provided with the vehicle at the same time, some rotation angles of some display screens cannot be too large to avoid affecting the user's driving. Therefore, each display screen has one maximum rotation angel, the maximum rotation angles can be set in advance in the vehicle display screen homing system. The maximum rotation angle is a maximum angle at which the display screen rotates in a certain direction. For example, a first display screen is located near a steering wheel, the current angle of the first display screen is 90°, which does not affect the user's driving. However, when the current angle of the first display screen is 180°, the user's driving is affected. The maximum rotation angle needs to be set to 90°. A second display screen is located in front of a co-pilot position, the maximum rotation angle corresponding to the second display screen can be 360°. No matter how much the angle between the position of the second display screen and the horizon line of the ground is, it will not affect the user's driving.

In other embodiments, the maximum rotation angle of the display screen in the vehicle can also be set according to the actual needs of other persons in the vehicle, and multiple maximum rotation angles of multiple display screens can be the same or different.

In block S400, the driving member is switched from the locked state to an unlocked state when the first objective angle is determined not equal to the current angle and the first objective angle is determined not greater than the maximum rotation angel.

In some embodiments, when the vehicle display screen homing system determines that the first objective angle is not equal to the current angle, and the first objective angle is not greater than the maximum rotation angle. First, the driving member is switched from the locked state to the unlocked state. The driving member in the locked state means that the driving member cannot rotate the display screen. The driving member in the unlocked state means that the driving member can rotate the display screen. After the first objective angle is determined equal to the current angle and the first objective angle is determined greater than the maximum rotation angle, the driving member is switched from the locked state to the unlocked state, the user's wrong operation of the display screen can be avoided. For example, when children are in the vehicle, the child may rotate a display screen while the user is driving. If a working state of the driving member is not restricted, the rotation of the display screen may affect the user's driving.

In some embodiments, a current speed of the vehicle is determined within a preset speed range. If the current speed is determined greater than a maximum value of the preset speed range and a device controller is in a closed state, the closed state of the device controller is no power on state. The driving member is switched from the unlocked state to the locked state. Users can set the preset speed range in advance. When a speed of the vehicle is too high, the display screen is rotated, the preset speed range is set, the current speed is determined greater than the maximum value of the preset speed range, the driving member is in the locked state, the user is not distracted by the rotation of the display screen while driving, and accidents will not occur.

In some embodiments, when the current speed of the vehicle is within the preset speed range and the current angle is determined not equal to an initial angle, the display screen is rotated by the driving member to the initial angle, the initial angle is an angle when the display screen is in an initial position. The initial position can be 0°. When the display screen is a cuboid and the display screen is in the initial position, one side of the display screen is parallel to the ground level to ensure that the display screen does not affect the user's driving. In other embodiments, the initial angle is 90°. The display screen in the initial position does not affect the user's driving.

In some embodiments, when the current speed of the vehicle is less than a minimum of the preset speed range, the display screen sends rotation permission information, the display screen receives rotation permission information, and the display screen is rotated by the driving member to the first objective angle based on the rotation permission information.

In block S500, the display screen is rotated by the driving member to the first objective angle.

In one embodiment, when the first objective angle is determined not equal to the current angle and the first objective angle is determined greater than the maximum rotation angel, display alarm information is sent, and the driving member is switched from the locked state to the unlocked state; and the display screen is rotated by the driving member to an initial angle, the initial angle is an angle when the display screen is in an initial position. For example, when the first objective angle is determined not equal to the current angle, and the first objective angle is determined greater than the maximum rotation angle, the vehicle display screen homing system sends the display screen alarm information to the user to remind the user that a range of the first objective angle is too large, the vehicle display screen homing system will rotate the display screen to the initial angle in order to avoid damage the display screen.

Furthermore, if a second objective angle of the display screen is received, the second objective angle is determined equal to the current angle and is determined greater than the maximum rotation angel. The second objective angle is an angle when the display screen is in a second objective position. When the second objective angle is determined not equal to the current angle and the second objective angle is determined greater than the maximum rotation angel, the driving member is switched from the unlocked state to an off state. The driving member is in the off state means that the driving member will stop working in a certain week and will automatically be in the working state again after the end of the cycle. For example, when children are in the vehicle, the children frequently operate the display screen to rotate, and a rotating objective angle of the display screen is determined greater than the maximum rotation angle, the driving member is in the locked state to avoid damaging to the display screen and the driving member.

In one embodiment, when the second objective angle is determined not equal to the current angle and the second objective angle is determined not greater than the maximum rotation angel, the display screen is rotated by the driving member to the second objective angle. The driving member is switched from the unlocked state to the locked state. When the user operates other display screens, the user mistakenly rotates the display screen, the user rotates the display screen to the original position, and an accident occurs.

The user can set the maximum rotation angle of the display screen in advance in the vehicle display screen homing system. When the first objective angle is equal to the current angle, and the first objective angle is determined not greater than the maximum rotation angle, the driving member is switched from the locked state to the unlocked state. The driving member rotates the display screen to the first objective angle. On the one hand, the first objective angle meets a preset condition, the state of the driving member is converted to avoid the user touching the display screen by mistake. On the other hand, when the current speed is determined greater than the maximum value of the preset speed range, the rotation of the display screen is limited to avoid affecting the user's driving.

Figure 2:
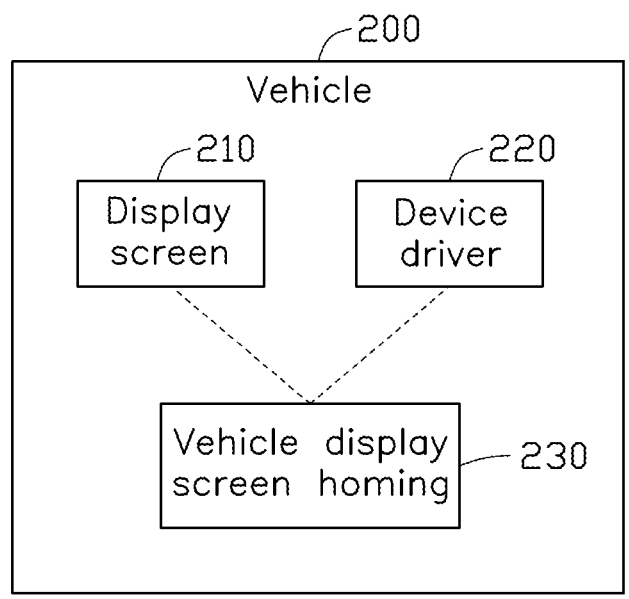
FIG. 2 is a structural diagram of the vehicle in an embodiment of the present disclosure.

In some embodiments, referring to FIG. 2, the vehicle 200 is provided. The vehicle 200 includes at least one display screen 210, at least one driving member 220 and a vehicle display screen homing system 230. The display screen 210 is connectable and controllable by at least one driving member 220 of the vehicle 200. The vehicle display screen homing system 230 is connectable to each of the display screen 210 and the at least on driving member 220. The vehicle display screen homing system 230 is configured to perform a display screen homing method applicable in a vehicle.

Figure 3:
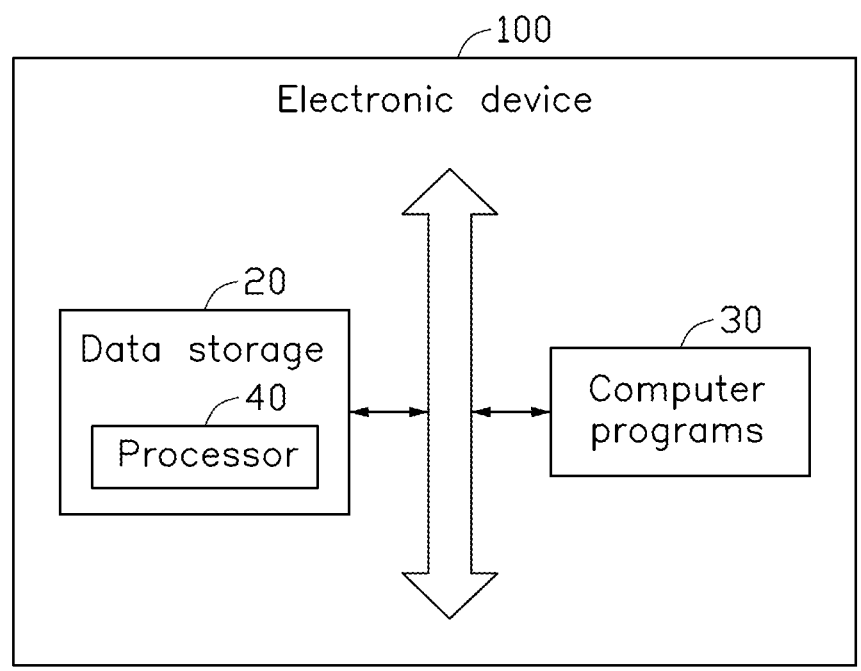
FIG. 3 is a structural diagram of an electronic device of the present disclosure.

As shown in FIG. 3, one exemplary embodiment of an electronic device 100 comprises a data storage 20, at least one processor 30 and a computer program 40. The data storage 20 stores one or more programs which can be executed by the at least one processor 30. The data storage 20 is used to store instructions, and the processor 30 is used to call up instructions from the data storage 20, the computer programs 40 is stored in the data storage 20 and run on the processor 30, so that the electronic device 100 performs the steps of display screen homing method in the above embodiment. The electronic devices 100 can be desktop computers, laptops, handheld computers, cloud servers, and other computing devices. The electronic devices 100 can interact with users through keyboard, mouse, remote control, touchpad, or voice control devices.

In one embodiment, a non-transitory storage medium recording instructions is disclosed. When the recorded computer instructions are executed by a processor of an electronic device 100, the electronic device 100 can perform the method.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A display screen homing method applicable in a vehicle comprising:
   obtaining a current angle of a display screen in the vehicle, using a hall sensor, wherein the current angle is an angle of the display screen in a position when a driving member is in a locked state, and the display screen is connected to the driving member;
   receiving a first objective angle when the display screen is in a first objective position;
   determining whether the first objective angle is equal to the current angle and whether the first objective angle is greater than a maximum rotation angle;
   switching the driving member from the locked state to an unlocked state when the first objective angle is determined not equal to the current angle and the first objective angle is determined not greater than the maximum rotation angle; and
   controlling the driving member in the unlocked state to rotate the display screen to the first objective angle based on a voice control technology.

2. The display screen homing method of claim 1, wherein after switching the driving member from the locked state to an unlocked state when the first objective angle is determined not equal to the current angle and the first objective angle is determined not greater than the maximum rotation angle, the display screen homing method further comprises:
   determining whether a current speed of the vehicle is within a preset speed range; and
   switching the driving member from the unlocked state to the locked state when the current speed of the vehicle is determined greater than a maximum value of the preset speed range and a device controller is in a closed state, the closed state of the device controller is no power on state.

3. The display screen homing method of claim 2, further comprising:
   rotating the display screen to an initial angle by the driving member when the current speed of the vehicle is determined within the preset speed range and the current angle is determined not equal to the initial angle, wherein the initial angle is an angle when the display screen is in an initial position.

4. The display screen homing method of claim 2, wherein rotating the display screen to the first objective angle by the driving member comprises:
   receiving rotation permission information when the current speed of the vehicle is determined less than a minimum value of the preset speed range; and
   rotating the display screen to the first objective angle by the driving member based on the rotation permission information.

5. The display screen homing method of claim 1, further comprising:
   sending display alarm information and switching the driving member from the locked state to the unlocked state when the first objective angle is determined not equal to the current angle and the first objective angle is determined greater than the maximum rotation angle; and
   rotating the display screen to an initial angle by the driving member, wherein the initial angle is an angle when the display screen is in an initial position.

6. The display screen homing method of claim 1, further comprising:
   receiving a second objective angle of the display screen, wherein the second objective angle is an angle when the display screen is in a second objective position;
   determining whether the second objective angle is equal to the current angle and whether the second objective angle is greater than the maximum rotation angle; and
   switching the driving member from the unlocked state to an off state when the second objective angle is determined not equal to the current angle and the second objective angle is determined greater than the maximum rotation angle.

7. The display screen homing method of claim 6, further comprising:
rotating the display screen to the second objective angle by the driving member when the second objective angle is determined not equal to the current angle and the second objective angle is determined not greater than the maximum rotation angle; and
switching the driving member from the unlocked state to the locked state.

8. A vehicle, the vehicle comprises at least one display screen, at least one driving member, and a vehicle display screen homing system, wherein:
the display screen is connectable and controllable by at least one driving member of the vehicle,
the vehicle display screen homing system is connectable to each of the display screen and the at least on driving member, and
the vehicle display screen homing system is configured to perform a display screen homing method, comprising:
obtaining a current angle of a display screen in the vehicle, using a hall sensor, wherein the current angle is an angle of the display screen in a position when a driving member is in a locked state, and the display screen is connected to the driving member;
receiving a first objective angle when the display screen is in a first objective position;
determining whether the first objective angle is equal to the current angle and whether the first objective angle is greater than a maximum rotation angle;
switching the driving member from the locked state to an unlocked state when the first objective angle is determined not equal to the current angle and the first objective angle is determined not greater than the maximum rotation angle; and
controlling the driving member in the unlocked state to rotate the display screen to the first objective angle by the driving member based on a voice control technology.

9. The vehicle of claim 8, wherein after switching the driving member from the locked state to an unlocked state when the first objective angle is determined not equal to the current angle and the first objective angle is determined not greater than the maximum rotation angle, the display screen homing method further comprises:
determining whether a current speed of the vehicle is within a preset speed range; and
switching the driving member from the unlocked state to the locked state when the current speed of the vehicle is determined greater than a maximum value of the preset speed range and a device controller is in a closed state, the closed state of the device controller is no power on state.

10. The vehicle of claim 9, further comprises:
rotating the display screen to an initial angle by the driving member when the current speed of the vehicle is determined within the preset speed range and the current angle is determined not equal to the initial angle, wherein the initial angle is an angle when the display screen is in an initial position.

11. The vehicle of claim 9, wherein rotating the display screen to the first objective angle by the driving member comprises:

receiving rotation permission information sent by the display screen when the current speed of the vehicle is determined less than a minimum value of the preset speed range; and
rotating the display screen to the first objective angle by the driving member based on the rotation permission information.

12. The vehicle of claim 8, further comprising:
sending display alarm information and switching the driving member from the locked state to the unlocked state when the first objective angle is determined not equal to the current angle and the first objective angle is determined greater than the maximum rotation angle; and
rotating the display screen to an initial angle by the driving member, wherein the initial angle is an angle when the display screen is in an initial position.

13. The vehicle of claim 8, further comprising:
receiving a second objective angle of the display screen, wherein the second objective angle is an angle when the display screen is in a second objective position;
determining whether the second objective angle is equal to the current angle and device the second objective angle is greater than the maximum rotation angle; and
switching the driving member from the unlocked state to an off state when the second objective angle is determined not equal to the current angle and the second objective angle is determined greater than the maximum rotation angle.

14. The vehicle of claim 13, further comprising:
rotating the display screen to the second objective angle by the driving member when the second objective angle is determined not equal to the current angle and the second objective angle is determined not greater than the maximum rotation angle; and
switching the driving member from the unlocked state to the locked state.

15. An electronic device comprising:
at least one processor; and
a data storage storing one or more programs which when executed by the at least one processor, cause the at least one processor to:
obtain a current angle of a display screen in the vehicle, using a hall sensor, wherein the current angle is an angle of the display screen in a position when a driving member is in a locked state, and the display screen is connected to the driving member;
receive a first objective angle when the display screen is in a first objective position;
determine whether the first objective angle is equal to the current angle and whether the first objective angle is greater than a maximum rotation angle;
switch the driving member from the locked state to an unlocked state when the first objective angle is determined not equal to the current angle and the first objective angle is determined not greater than the maximum rotation angle; and
control the driving member in the unlocked state to rotate the display screen to the first objective angle based on a voice control technology.

* * * * *